Jan. 5, 1943.  C. L. PAULUS  2,307,067
SERVO CYLINDER
Filed April 28, 1941
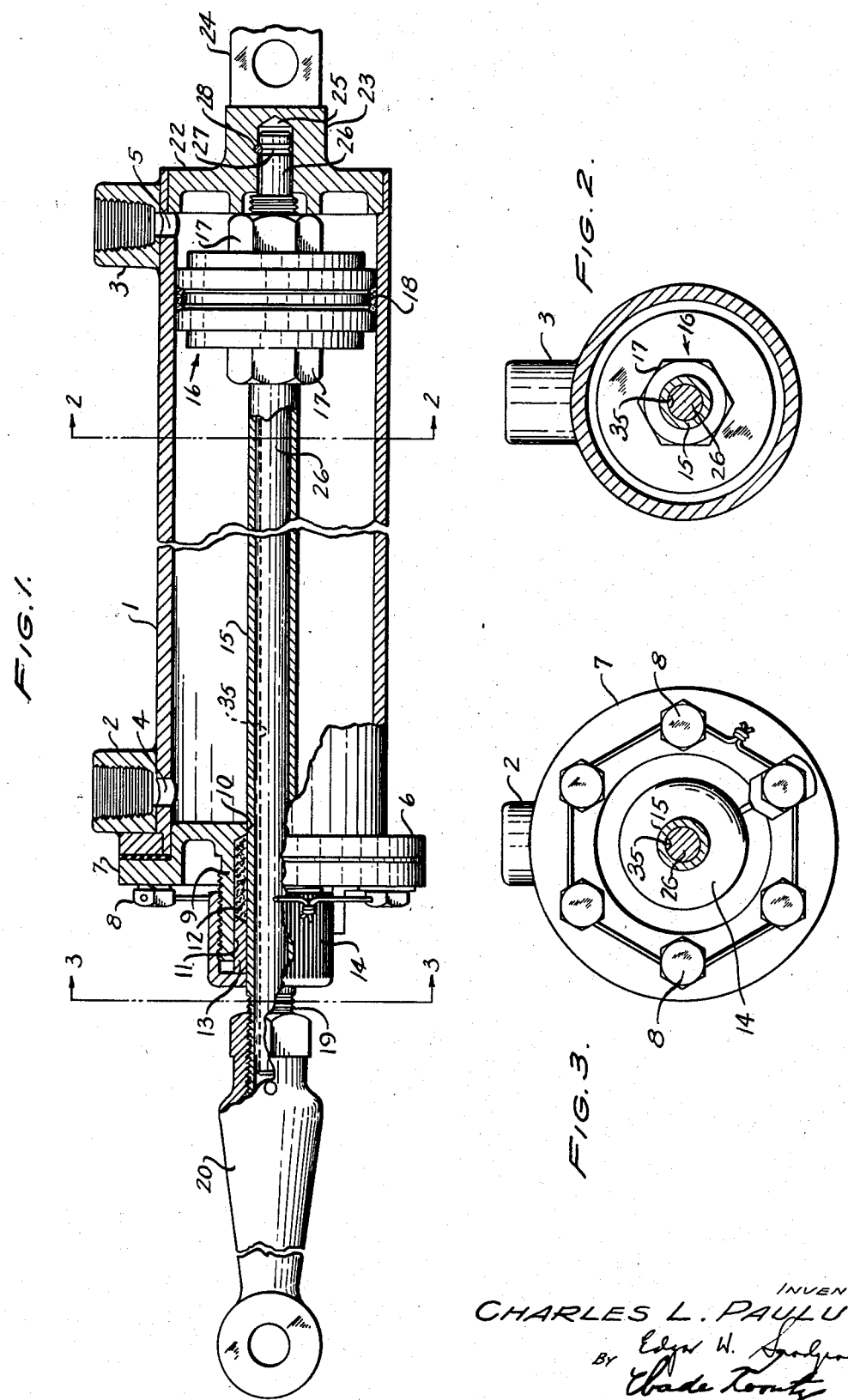
INVENTOR
CHARLES L. PAULUS Patented Jan. 5, 1943

2,307,067

UNITED STATES PATENT OFFICE 2,307,067

SERVO CYLINDER

Charles L. Paulus, Dayton, Ohio

Application April 28, 1941, Serial No. 390,773

3 Claims. (Cl. 308—4)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel construction of a cylinder and piston assembly for use as a fluid-pressure actuated expansible chamber motor and in which the piston and piston rod are guided throughout the piston stroke without requiring the use of an external crosshead and crosshead guides.

In the use of fluid-pressure actuated servomotors of the reciprocating piston type in aircraft for example in conjunction with an automatic pilot, wheel-retracting mechanism and the like, space and weight limitations prevent the use of external crossheads and guides to guide the piston and piston rod throughout the piston stroke and a guide formed in one of the cylinder heads has been the only guide provided for the piston rod. In service such a guide has proven ineffective to prevent cocking of the piston and excessive wear on the piston packing and packing gland for the piston rod, thus greatly increasing the cost of maintenance and reducing the service life of the motor.

The present invention has for its object the overcoming of the difficulties encountered with the prior art type of construction by providing an expansible chamber motor including a cylinder having a pair of cylinder heads located at opposite ends thereof, one of the heads being provided with a piston rod guide concentric with the axis of the cylinder and serving to guide a reciprocable hollow piston rod extending within the cylinder, a piston mounted on the piston rod to cause reciprocation of the same under the influence of fluid pressure and a guide rod floatingly secured at one end to the other of said cylinder heads and extending in guiding relation within the hollow piston rod, the guide rod projecting beyond the piston rod guide in the said one cylinder head.

A further object of the invention is the provision in a cylinder and piston assembly of a hollow piston rod having a stationary guide enclosed thereby, said guide being attached at one end to one of the cylinder heads by a connection allowing a limited angular movement of said guide.

Other objects of the invention not specifically enumerated above will appear by reference to the specification and the appended drawing in which:

Figure 1 is a side elevation partly in section illustrating an expansible chamber motor made in accordance with the invention;

Figure 2 is a sectional view taken on line 2—2 of Figure 1; and

Figure 3 is a sectional view taken on line 3—3 of Figure 1.

Referring now to Figure 1, the reference numeral 1 indicates the cylinder of an expansible chamber servomotor, the cylinder being provided with externally threaded annular bosses 2 and 3 welded to the side wall of the cylinder at opposite ends thereof, and serving to furnish fluid-pressure connections to the ports 4 and 5 respectively formed in the cylinder wall. The cylinder is provided at its outer end with an annular flange 6 suitably secured thereto as by welding, and serving as a mounting for an annular cylinder head 7 secured thereto by means of screws 8, suitable packing being inserted between the flange 6 and the cylinder head 7. The cylinder head 7 is provided with a centrally disposed annular boss 9 externally threaded and provided with a central bore 10 and an enlarged counterbore 11, the wall serving to retain an annular packing element 12 which is retained by an annular ring 13 disposed within the counterbore 11. Suitable sealing pressure is applied to the packing element 12 by means of a gland nut 14 threaded onto the boss 9 and engaging the annular ring 13. The bore 10, annular packing element 12 and retaining ring 13 together serve as a combination guide and seal for a hollow annular piston rod 15 which extends therethrough into the interior of the cylinder 1. The piston rod 15 has an annular divided type piston generally indicated by the reference numeral 16 mounted thereon adjacent its inner end, the piston being retained on the rod by means of the nuts 17 located on opposite sides thereon, and the piston being maintained in sealed relation with the internal walls of the cylinder 1 by means of a conventional packing ring 18. At its outer end the hollow piston rod 15 is suitably plugged and is externally threaded as at 19 to receive a terminal fitting 20 which may be attached to any device required to be actuated by fluid pressure admitted to the cylinder 1 on either side of the piston 16 through the respective ports 4 and 5. At its inner end the cylinder 1 is closed by means of a cylinder head 22 secured therein as by welding or brazing, the cylinder head being provided with a centrally disposed boss 23 terminating in a lug portion 24 which serves as a means to pivotally mount the cylinder upon a suitable base structure, not shown. The boss 23 is provided with a centrally disposed aperture 25 which is adapted to receive the inner end of a guide rod 26 which extends through the hollow piston rod 15 to a point well beyond the packing gland nut 14, the guide being in close supporting contact with the inner walls of the annular piston rod 15. At its inner end the diameter of the guide rod 26 is made slightly smaller than the diameter of the aperture 25 so that there is a small clearance therebetween, and the guide rod is provided with a circular notch 27 which is adapted to receive a transversely disposed pin 28 carried by the boss 23, the pin preventing axial movement of the rod 26 but allowing a small limited angular movement of the guide rod relative to the longitudinal axis of the cylinder 1. The guide rod 26 is provided with a shallow groove 35 extending along the length thereof and communicating at its inner end with the space within the cylinder behind the piston 16 and serving to eliminate the trapping of fluid within the hollow piston rod 15 adjacent the outer end of the guide rod 26.

Operation

When fluid under pressure is admitted to either of the cylinder ports 4 or 5 from a controlled source of pressure, not shown, the piston 16 will be caused to reciprocate within the cylinder 1, the piston rod 15 being supported for reciprocable movement by means of the bearing guide and packing provided in the cylinder head 7, and also being supported throughout its stroke by means of the guide 26 extending within the hollow piston rod 15. As the piston rod 15 is extended through the cylinder head 7 bending forces may be introduced tending to cause the rocking of the piston rod within its outer support which rocking movement tends to cause a cocking of the piston 16 within the cylinder 1 which, as pointed out above, resulted in the prior art devices in excessive wear on the piston rod guide, and piston packing, and further caused excessive wear and scuffing of the cylinder walls, but due to the provision of the guide 26 in the present construction any tendency of the piston or piston rod to tilt or rotate in a plane normal to the longitudinal axis of the cylinder is prevented even though the piston be moved axially towards the left as seen in Figure 1 to its extreme limiting position. The provision of the floating or semi-universal connection between the inner end guide rod 26 and the cylinder head 22 insures that the piston and piston rod may be assembled in proper guiding relation with the guide rod 26, even though there is a slight misalignment with the longitudinal axis of the cylinder due for example, to uneven tightening of the screws 8 which retain the removable cylinder head 7 in position. The provision of the novel piston and piston rod guide in accordance with the invention has reduced fluid leakage through the piston rod packing gland to a minimum and has greatly increased the service life of power cylinders of this character. The novel provision for mounting the guiding structure wholly within the cylinder has not increased the overall length of the assembly so that the power cylinders made in accordance with the invention may be used to replace existing equipment without requiring any structural changes in the mounting structure.

While the piston and cylinder construction in accordance with the invention is particularly well suited for use as an expansible chamber servomotor, it is to be understood that the same construction is of general application and may be applied for example, in a cylinder pump. Further the construction is also applicable to single-acting expansible chamber devices.

While a preferred form of the invention has been illustrated and described, it will be apparent to those skilled in the art that many modifications and changes may be made therein falling within the scope of the invention as defined by the appended claims.

I claim:

1. In an expansible chamber motor, a cylinder, heads for enclosing the respective ends of said cylinder, a piston rod guide in one of said heads, a hollow piston rod extending through said guide into said cylinder, an annular piston mounted on said piston rod for reciprocation within said cylinder, a guiding element extending within said hollow piston rod and connected to the other of said cylinder heads, said guiding element extending beyond said piston rod guide, said guiding element being connected to said other cylinder head by a connection permitting a limited angular movement thereof in a plane normal to the axis of said cylinder.

2. In combination with a cylinder having a hollow piston rod and an annular piston mounted thereon reciprocable in the cylinder, a cover plate for one end of said cylinder, an annular piston rod guide carried by said cover plate, a guide rod within said cylinder concentric with the axis thereof and secured at its inner end to a cover plate for the other end of said cylinder, said guide rod extending through said piston into said hollow piston rod in guiding contact therewith, the contact portion of said guide being greater than the stroke of said piston in said cylinder, and the guide rod being secured to said cover plate for the other end of said cylinder by a semiuniversal connection permitting a limited angular movement of said guide rod in planes normal to the longitudinal axis of said cylinder.

3. In a device of the character described, a cylinder having a closure for at least one end thereof, an annular piston rod extending within said cylinder, an annular piston mounted on the lower end of said annular piston rod, a guide mounted concentric with the axis of said cylinder and extending within said hollow piston rod in guiding relation therewith and a semi-universal connection between one end of said guide and said cylinder closure, and a piston rod guide at the other end of said cylinder, said first-mentioned guide extending therethrough.

CHARLES L. PAULUS.